(12) United States Patent
Laskey

(10) Patent No.: US 6,883,852 B2
(45) Date of Patent: Apr. 26, 2005

(54) ARTICULATED DOOR WITH INTEGRATED HANDLE LATCH

(75) Inventor: Chester F. Laskey, Attica, MI (US)

(73) Assignee: Intier Automotive Inc., Newmarket (CA)

( * ) Notice: Subject to any disclaimer, the term of this patent is extended or adjusted under 35 U.S.C. 154(b) by 26 days.

(21) Appl. No.: 10/337,163

(22) Filed: Jan. 6, 2003

(65) Prior Publication Data

US 2004/0130174 A1 Jul. 8, 2004

(51) Int. Cl.[7] ................................................. B60R 7/04
(52) U.S. Cl. .................... 296/37.8; 296/24.34; 220/350
(58) Field of Search .............................. 296/37.1, 37.8, 296/37.9, 37.12, 37.13, 24.34, 24.46; 220/350, 345.3; 224/483, 926, 311, 539; 248/34.2, 312.2; 297/188.19

(56) References Cited

U.S. PATENT DOCUMENTS

| | | | |
|---|---|---|---|
| 4,854,632 A | | 8/1989 | Kreuze et al. |
| 6,003,925 A | * | 12/1999 | Litke et al. ................ 296/37.8 |
| 6,126,221 A | * | 10/2000 | Kern ........................ 296/37.8 |
| 6,478,204 B1 | * | 11/2002 | Lange et al. ................ 224/539 |
| 6,499,785 B1 | * | 12/2002 | Eguchi ...................... 296/37.8 |
| 6,672,554 B1 | * | 1/2004 | Fukuo ..................... 297/188.19 |
| 2002/0070220 A1 | * | 6/2002 | Kuehn et al. ............... 220/350 |

FOREIGN PATENT DOCUMENTS

JP 40819268 A * 7/1996

* cited by examiner

*Primary Examiner*—Jason Morrow
(74) *Attorney, Agent, or Firm*—Honigman Miller Schwartz and Cohn LLP

(57) ABSTRACT

A vehicle trim component includes an articulated door with a flexible integral handle latch. The integral handle latch includes an integrally molded hook portion that positively engages a lip portion of a storage bin. The articulated door also includes a flex point permitting selective deployment of the articulated door, such as a tambour door. Upon pushing the handle latch in a predetermined direction with a predetermined force, the predetermined force is directly transmitted to the flex point in order to cause pivoting movement of the integral handle latch that permits deployment of the articulated door. If a force is applied in a direction other than the predetermined direction, deployment of the articulated door does not occur and the articulated door is retained in a latched position. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

16 Claims, 6 Drawing Sheets

ARTICULATED DOOR WITH INTEGRATED HANDLE LATCH

TECHNICAL FIELD

The present invention relates to an interior trim component of a vehicle, and in particular to a vehicle trim component including an articulated door with an integral handle latch to prevent the articulated door to be unlatched during an undesirable loading event.

BACKGROUND OF THE INVENTION

Typically, vehicular trim components, such as storage bins including a door, may also include a mechanical-type latch. Conventional mechanical-type latches may include a push-button release mechanism, a magnet, or VELCRO® to retain the door in a closed position. However, these conventional mechanical-type latches may introduce undesirable design issues and increase cost, production time, and parts, such as spring-loaded pins or detention balls. Even further, although adequate for most situations, these conventional mechanical-type latches may be unreliable in retaining the door in a closed position during an undesirable loading event, thereby failing certain vehicular safety guidelines, such as those stated under the Federal Motor Vehicle Standards (FMVSS) specification 201. Thus, a need exists for an improved latch for a storage bin door that reduces cost, production time, parts, and design issues, while also complying to specified safety guidelines.

SUMMARY OF THE INVENTION

The inventors of the present invention have recognized these and other problems associated with conventional mechanical-type latches for vehicular trim components including a storage bin and associated door. To this end, the inventors have developed a vehicle trim component comprising an articulated door including a flexible integral handle latch. The integral handle latch includes an integrally molded hook portion that engages a lip portion of a storage bin to prevent the articulated door to be unlatched during an undesirable loading event.

In another aspect of the invention, a vehicular trim component comprises a tambour door including a flexible integral handle latch. The handle latch includes an integrally molded hook portion for engaging a lip portion of a storage bin. The lip portion includes a contact surface for retaining the hook portion in a latched state, and a fell-like detent defined by a draft angle defining the effort needed to latch the tambour door and the dampening of noises created by the unlatching of the hook portion from the lip portion. The tambour door includes a top surface having a flex point located proximate to the handle latch permitting selective deployment of the tambour door. Upon pushing the handle latch with a predetermined force, the predetermined force is directly transmitted to the flex point causing pivoting movement of the integral handle latch that allows the integral handle latch to permit deployment of the tambour door

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
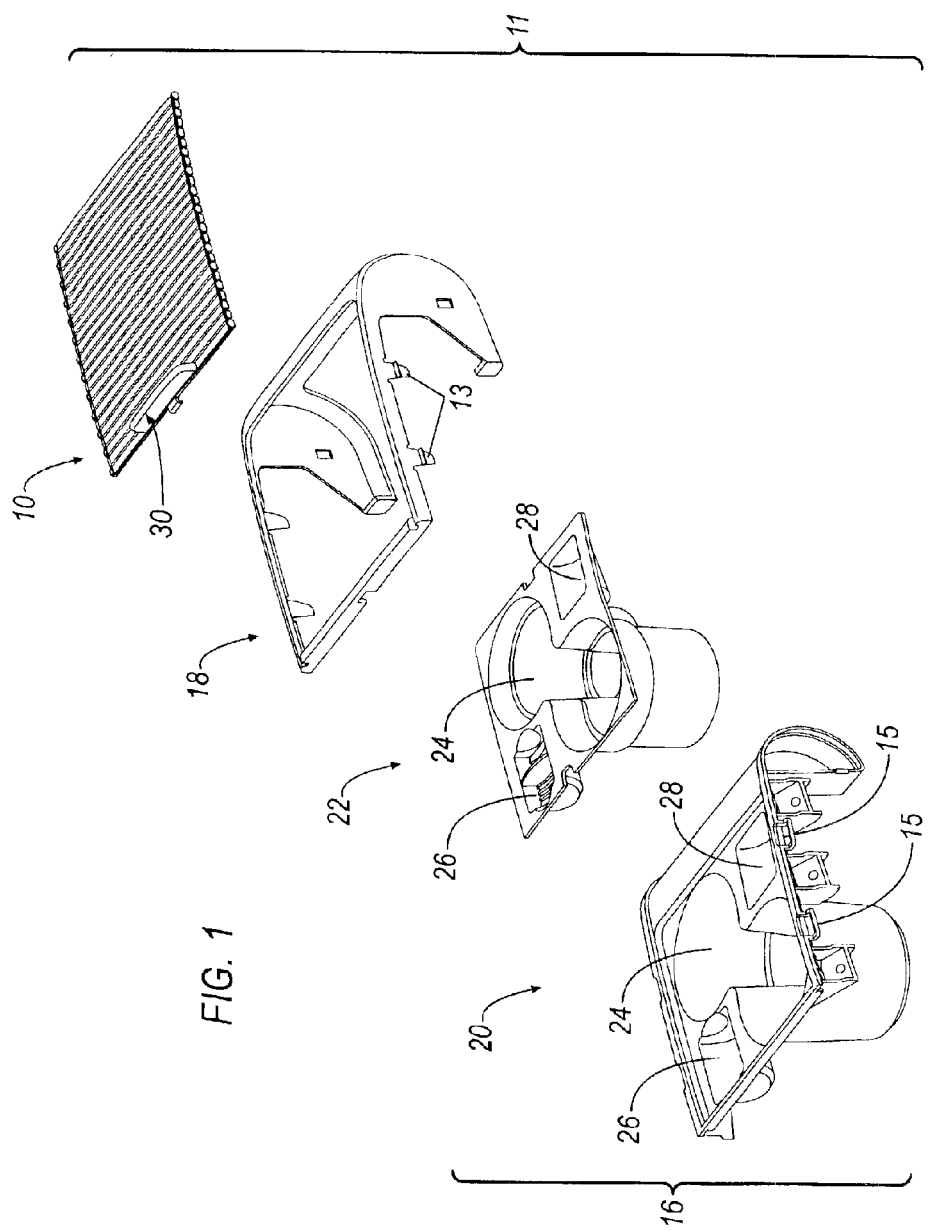
FIG. 1 is an exploded view of a vehicle trim component including an articulated door according to an embodiment of the invention.
Figure 2:
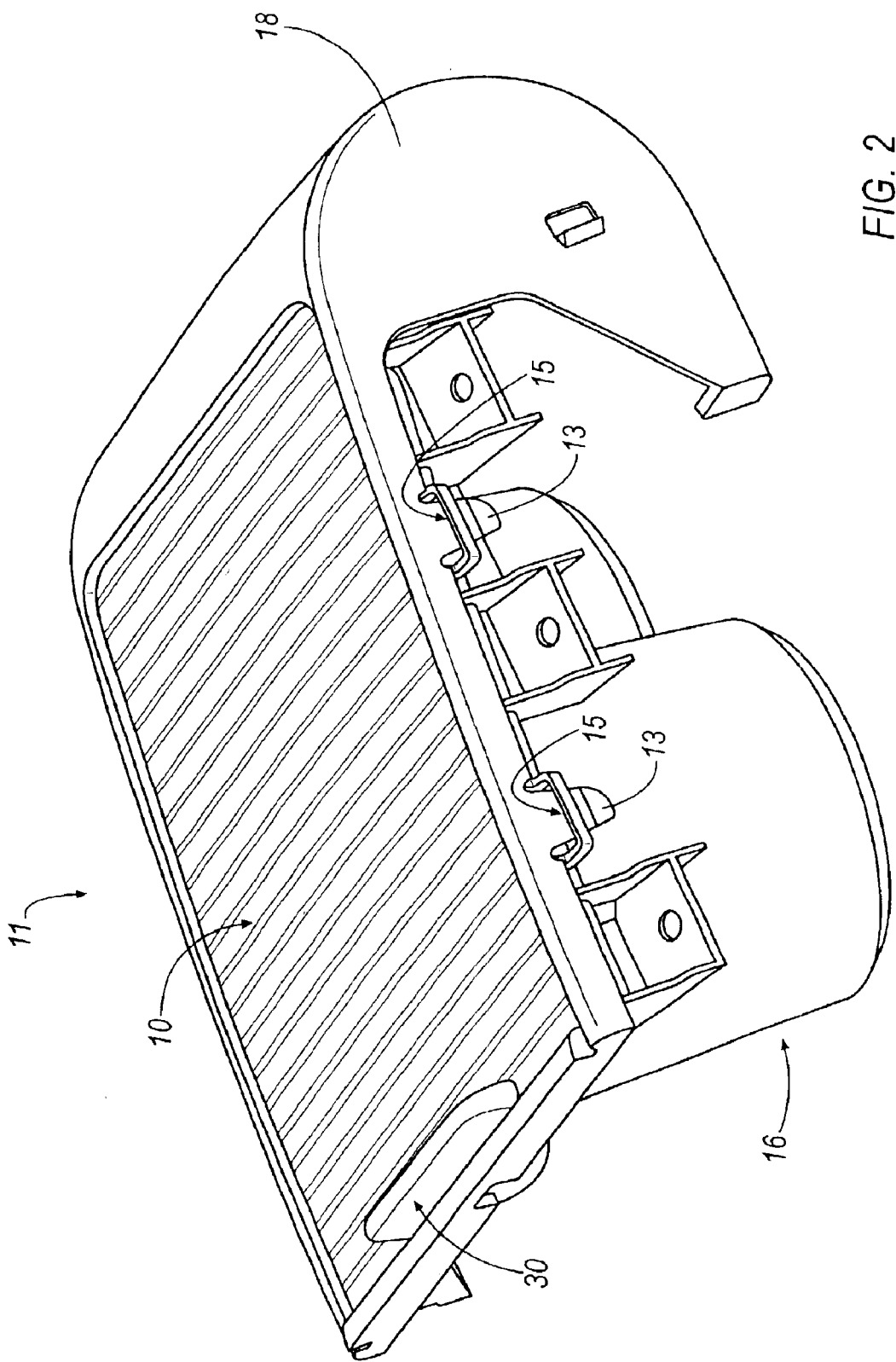
FIG. 2 is a perspective view of the vehicle trim component of FIG. 1 when the articulated door is in a deployed, latched position.
Figure 5A:
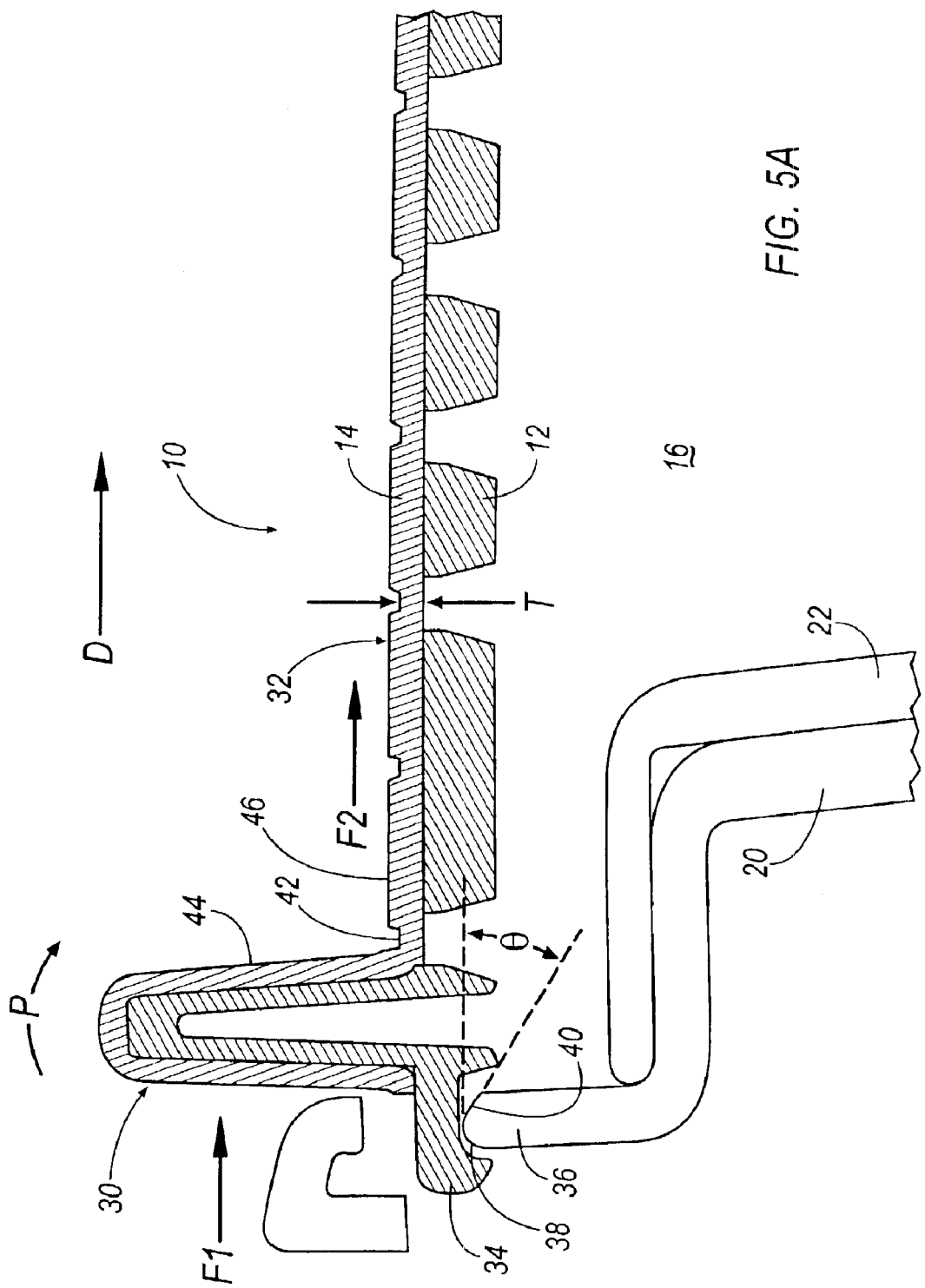
FIG. 5A is an enlarged cross-sectional view of the vehicle trim component of FIG. 4 designated at 5A.
Figure 5B:
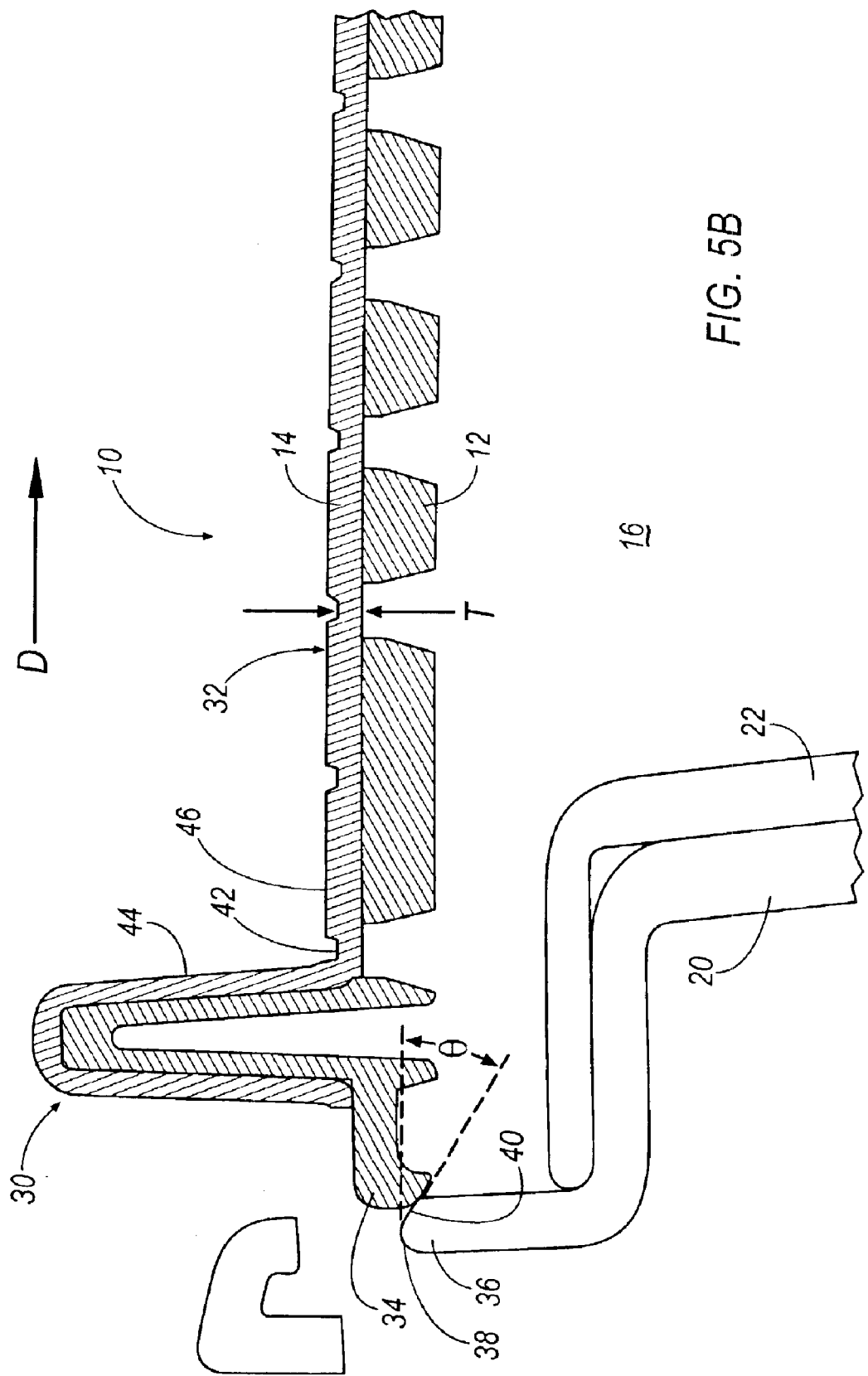
FIG. 5B is an enlarged partial cross-sectional view similar to FIG. 5A, except that the articulated door is in an unlatched, partially stowed position.

Referring to FIGS. 1 and 2, a vehicle trim component, shown generally at 11, includes an articulated door, shown generally at 10, according to one embodiment of the invention. The articulated door 10 may be formed using any desirable method, such as injection molding, and made from any desirable thermoplastic resin, such as, for example, Acrylnitril-Butadien-Styrol-Copolymere (ABS), Polypropylene (PP), Polycarbonate-Acrylnitril-Butadien-Styrol-Copolymere (PC/ABS), Thermoplastic Olefin (TPO), polyvinyl chloride (PVC), or the like. Alternatively, the articulated door 10 may be formed using a multi-shot injection molding process such that thermoplastic resins having different properties, such as hardness, may be injected into a single mold to form the articulated door 10. Thus, the multi-shot molding process allows the articulated door 10 to be comprised of a relatively rigid substrate 12 and a relatively soft skin material 14 (FIGS. 5A and 5B). For example, the substrate 12 may be made of a thermoplastic resin (listed above), and the skin material 14 may be an abrasion-resistant thermoplastic elastomer, such as a type commercially available under the trade name SANTOPRENE®. The inventive feature and utility aspects of the articulated door 10 is described in more detail below.

According to one embodiment of the invention, the articulated door 10 may be a "roll top" or "tambour" door. Specifically, the articulated door 10 may include a plurality of thin adjacent strips of skin material 14 that are bonded or integrally formed with a flexible substrate 12 that provides support for the skin material 14. There are several uses for the articulated door 10 of the invention. For example, the articulated door 10 can be used to selectively closing off a compartment, such as a vehicular storage bin 16 (FIGS. 1, 4–5B). In another example, the articulated door 10 can be folded and stowed within or behind the compartment about a guide 18 in a compact, rolled or folded position. The guide 18 permits deployment and stowing of the articulated door 10 while also serving to function as a housing for the storage bin 16. The guide 18 may be fastened to the storage bin 16 by a plurality of snap tabs 13 and snap tab passages 15. Alternatively, the guide 18 and storage bin 16 may be attached with any desirable fastener such as heatstakes, screws, bolts, glue, or the like.

Referring now to FIG. 1, the storage bin 16 may be further defined by a base 20 and a liner 22. In order to permit ease of cleaning or maintenance of the vehicle trim component 11, the base 20 and liner 22 may each be formed by use of a single shot injection molding process such that the storage bin 16 is a two-piece part that allows selective removal of the liner 22 from the base 20. Alternatively, the base 20 and liner 22 may be formed in a multi-shot injection molding process, as described above, such that the base 20 and liner 22 forms an integral one-piece storage bin 16. If either a single-shot or a multi-shot injection molding process is used, the base 20 may be made of PP, ABS, PC/ABS, TPO, or PVC, and the liner 22 may be made of SANTOPRENE®.

The base 20 and liner 22 may be further defined to include a plurality of storage areas designed to store any desirable item within the confines of the storage area. As shown in the illustrated embodiment, the storage bin 16 includes a cupholder 24, a change tray 26, and an ash tray 28. However, although not illustrated, the articulated door 10 may be used to close off the storage areas in the vehicle, such as, for example, a glove box, a passenger side door storage bin, or the like.

Figure 3:
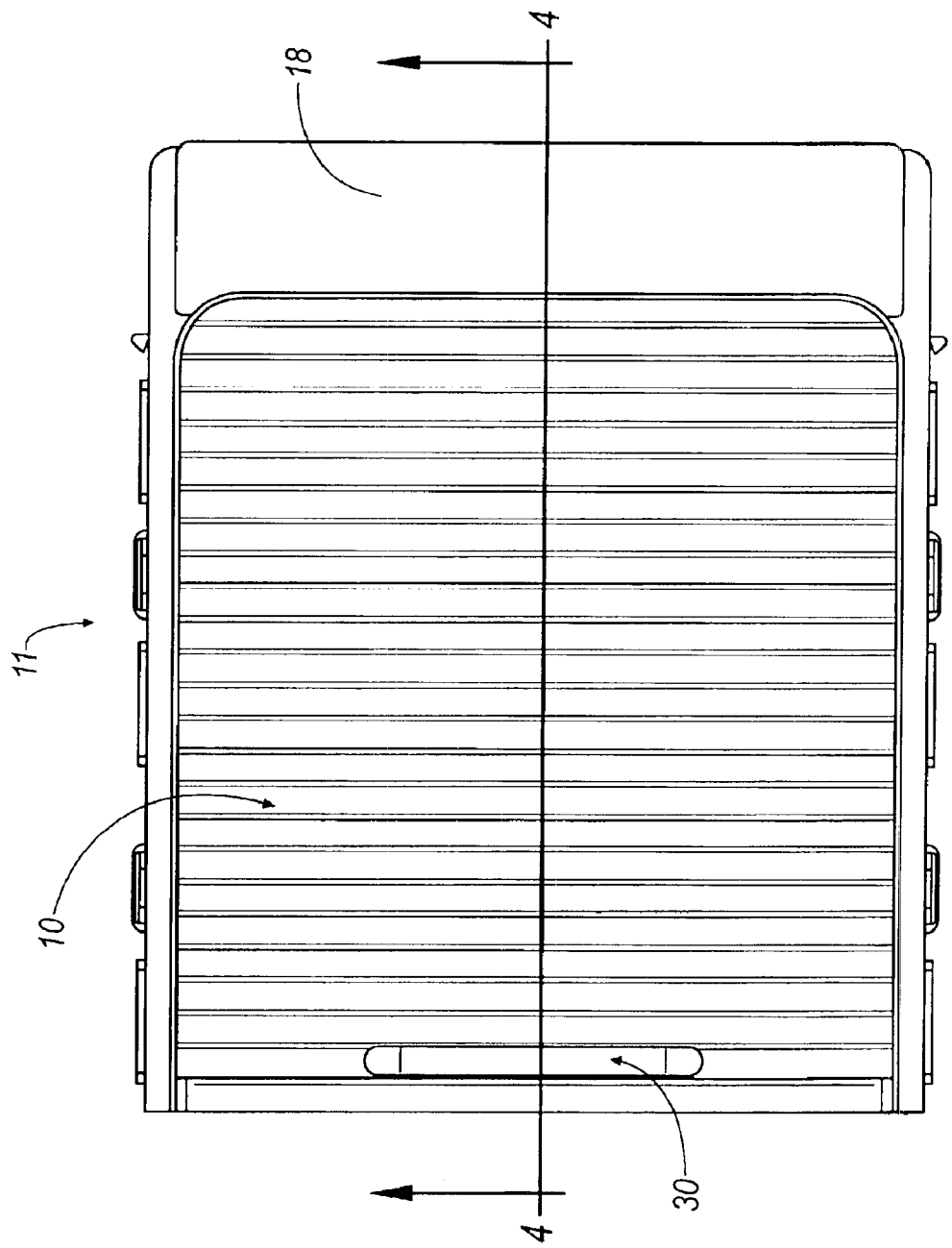
FIG. 3 is a top view of the vehicle trim component of FIG. 2.
Figure 4:
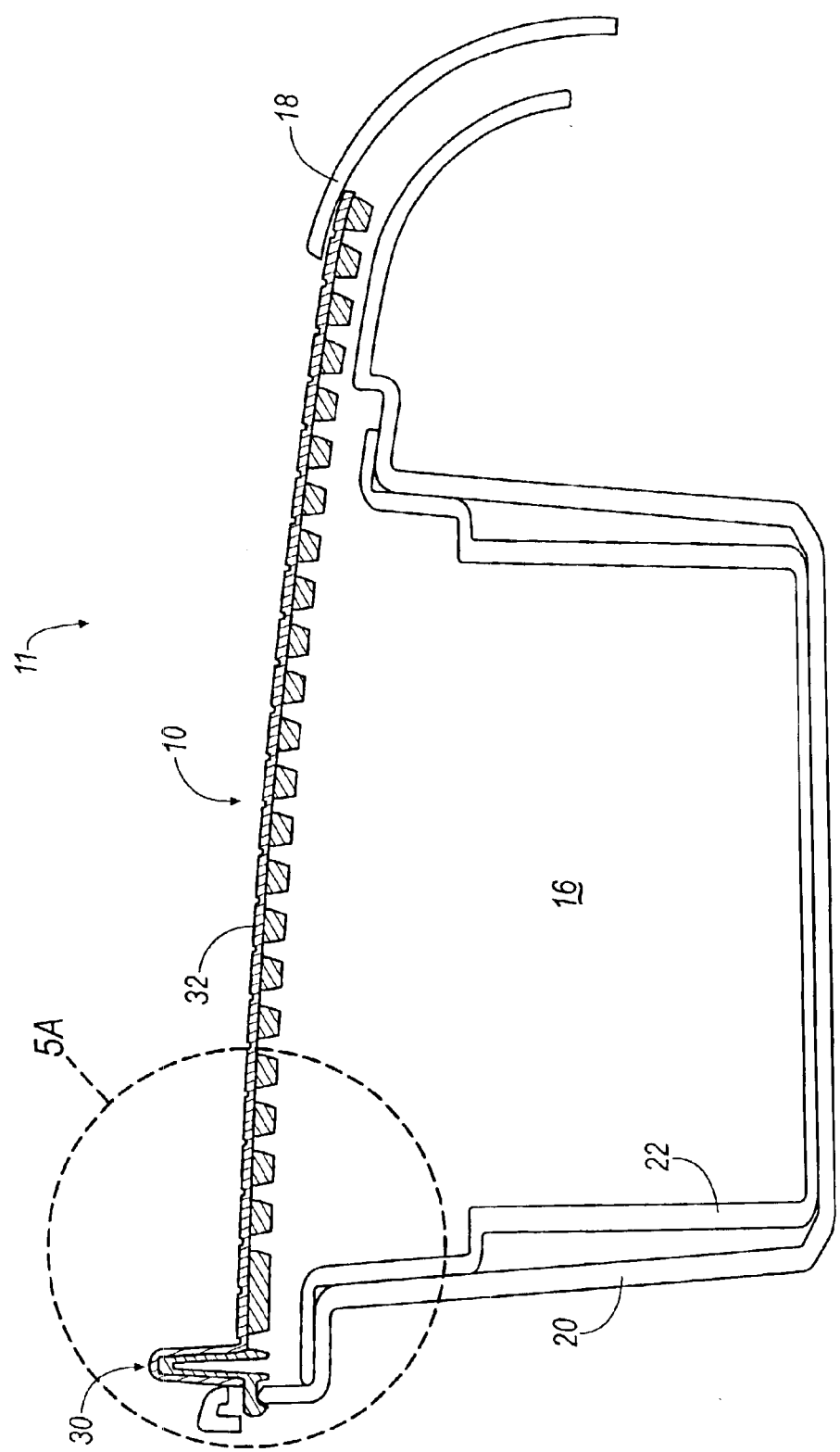
FIG. 4 is a cross-sectional view of the vehicle trim component taken along line 4—4 of FIG. 3.

Referring to FIGS. 2 and 3, the fully assembled vehicle trim component 11 is shown when the articulated door 10 in a deployed, latched position. The articulated door 10 includes an integral handle latch 30 that extends from a top portion 32 (FIGS. 4–5B) of the articulated door 10. One aspect of the invention is that the handle latch 30 is a single component that functions both as a handle and a latch member. As illustrated in FIGS. 4–5B, the handle latch 30 is hollow to permit during the injection molding process. The hollow structure of the handle latch 30 may also provide improved gripping qualities that permit a user to pinch and elastically deform the handle latch 30 during deploying or stowing of the articulated door 10. However, if desired, the handle latch 30 may be formed as a solid part, rather than a hollow structure.

As seen in FIGS. 5A and 5B, the handle latch 30 comprises an integral hook portion 34 defined by a U- or V-cross-sectional shape that engages a lip portion 36 of the storage bin 16. The lip portion 36 includes contact surface 38 that may be adjusted to either increase or decrease an amount of deployment force that needs to be exerted in the direction of the arrow F1 to overcome the frictional force that retains the hook portion 34 in a latched state with the lip portion 36. For example, the deployment force that needs to be exerted in the direction of the arrow F1 can be decreased by providing the contact surface 38 with a rounded surface having a relatively low coefficient of friction. Conversely, the deployment force that needs to be exerted in the direction of the arrow F1 can be increased by providing the contact surface 38 with a generally non-rounded surface, such as a flat top surface and a generally flat forwardly facing surface that meets at a generally 90 degree right angle (not shown). It will be appreciated that the shape of the contact surface 38 can be adjusted in any appropriate manner to increase or decrease the amount of deployment force that needs to be exerted in the direction of the arrow F1.

The lip portion 36 may also be defined to include a fell-like detent 40 defined by a draft angle, θ. The draft angle, θ, may be selectively adjusted to dampen noises created by the unlatching of the hook portion 34 from the lip portion 36. An increase in the dampening effect can be realized by increasing the draft angle, θ, to permit ease of the disengagement of the hook portion 34 from the lip portion 36. Even further, the draft angle, θ, may also be selectively adjusted to either increase or decrease an amount of force needed to latch the articulated door 10 in a similar fashion as the shape of the contact surface 38 described above.

As illustrated, the articulated door 10 may also include a flex point 42 preferably located proximate to the handle latch 30 near a first strip 46 of the top portion 32. In the illustrated embodiment, the flex point 42 is selectively designed to be positioned in an area of the articulated door 10 comprising only the skin material 14 (i.e. in an area void of any substrate 12). Alternatively, if the articulated door 10 is made of a single material, then the flex point 42 may be selectively designed to have a minimal thickness, T, proximate to the handle latch 30, and preferably positioned near the inboard facing portion 44. Essentially, as described below, the flex point 42 acts as a live or living hinge and permits selective deployment of the articulated door 10 in a direction indicated by the arrow, D.

To deploy the articulated door 10 from the latched position shown in FIG. 5A, an operator pushes the handle latch 30, with the predetermined deployment force, F1. For example, it has been found that approximately at least 7 lbs/in² of deployment force, F1, is sufficient to pivot the handle latch 30 in the direction of the arrow P to disengage the hook portion 34 from the lip portion 36. Sufficient application of the predetermined deployment force in the direction of the arrow F1 causes elastic deformation or bending of the articulated door 10 at the flex point 42, thereby causing the handle latch 30 to pivot in the direction of the arrow P and disengagement of the hook portion 34 from the lip portion 36. The pivoting movement in the direction of the arrow P of the handle latch 30 permits the selective deployment of the articulated door 10 from an engaged or latched position (FIG. 5A) in the direction of the arrow D to a disengaged position (FIG. 5B). When the hook portion 34 is no longer in contact with the lip portion 36, and the deployment force is no longer applied to the handle latch 30, the memory or resilient qualities of the material comprising the flex point 42 causes the handle latch 30 to return to approximately the same position prior to the application of the deployment force.

In addition, the location of the flex point 42 proximate to the handle latch 30 prevents undesirable deployment of the articulated door 10. For example, if a person or object in the vehicle accidentally snags and pushes the articulated door 10 with an undesirable deployment force generally indicated in the direction of the arrow F2 (FIG. 5A) about the top portion 32, the hook portion 34 does not unlatch from the lip portion 36 because application of the undesirable deployment force in the direction of the arrow F2 is not directly translated to the flex point 42 in order to permit pivoting movement of the handle latch 30 in the direction of the arrow P. In other words, the articulated door 10 will not be unlatched even though an undesirable deployment force that may be equal to or greater than the deployment force needed to unlatch the articulated door was applied in the direction other than in the direction of the arrow F1 because the undesirable force was not directly translated to the flex point 42.

As described above, the embodiments of the vehicle trim component 11 reduces cost, production time, parts, and design issues. The articulated door 10 also provides an aesthetically pleasing cover to the vehicle trim component 11. Additionally, as described above, the design of the integral handle latch 30 permits selective deployment of the articulated door 10 and prevents an undesirable deployment force applied in the direction of the arrow F2 to the top portion 32 to unlatch and deploy the articulated door 10 in the direction of the arrow D. It will be appreciated that the undesirable force equal to or greater the deployment force needed to unlatch the deployment door 10 can be applied to the top portion 32 at substantially an infinite number of directions other than in the direction of the arrow F1 and the articulated door 10 will not be deployed, but will be retained in the latched position.

It should be understood that the aforementioned and other various alternatives to the embodiments of the invention described herein may be employed in practicing the inven-

What is claimed is:

1. A vehicle trim component, comprising:

an articulated door including a handle latch, the handle latch including a hook portion that engages a lip portion of a storage bin, wherein the articulated door includes a flex point proximate to the handle latch, and wherein a force applied to the handle latch causes pivoting movement of the handle latch about the flex point to latch or unlatch the articulated door.

2. The vehicle trim component according to claim 1, wherein the articulated door includes a substrate and a skin material bonded to the substrate.

3. The vehicle trim component according to claim 2, where the substrate comprises a rigid thermoplastic resin and the skin material comprises a thermoplastic elastomer.

4. The vehicle trim component according to claim 1, wherein the hook portion is defined by a U- or V-cross-sectional shape that extends from a top portion of the articulated door.

5. The vehicle trim component according to claim 1, wherein the lip portion includes a contact surface for engaging the hook portion when the articulated door is in a latched state.

6. The vehicle trim component according to claim 1, wherein the lip portion includes a detent defined by a draft angle that defines an amount of force needed to place the articulated door in a latched state.

7. The vehicle trim component according to claim 1, wherein the storage bin further comprises a base and a liner.

8. A vehicle trim component, comprising:

a tambour door including a handle latch, the handle latch including a hook portion for engaging a lip portion of a storage bin, wherein the lip portion includes:

a contact surface for retaining the hook portion in a latched state, a detent defined by a draft angle, and wherein the tambour door includes:

a top surface having a flex point proximate the handle latch wherein a force applied to the latch handle causes pivoting movement of the integral handle latch about the flex point to latch or unlatch the tambour door.

9. The vehicle trim component according to claim 8, wherein the integral handle latch extends from a top portion of the tambour door.

10. The vehicle trim component according to claim 8 further comprising a guide that permits deployment and stowing of the tambour door.

11. A vehicle trim component, comprising:

an articulated door including a handle latch, the handle latch including a hook portion that engages a lip portion of a storage bin, wherein the articulated door includes a living hinge proximate to the handle latch, and wherein a force applied to the handle latch causes pivoting movement of the handle latch about the living hinge to latch or unlatch the articulated door.

12. The vehicle trim component according to claim 11, wherein the articulated door includes a substrate and a skin material bonded to the substrate.

13. The vehicle trim component according to claim 12, where the substrate comprises a rigid thermoplastic resin and the skin material comprises a thermoplastic elastomer.

14. The vehicle trim component according to claim 11, wherein the lip portion includes a contact surface for engaging the hook portion when the articulated door is in a latched state.

15. The vehicle trim component according to claim 11, wherein the lip portion includes a detent defined by a draft angle that defines an amount of force needed to place the articulated door in a latched state.

16. The vehicle trim component according to claim 2, wherein the flex point is defined by an area of the articulating door comprising only the skin material.

* * * * *